United States Patent
Washino

(10) Patent No.: US 10,968,311 B2
(45) Date of Patent: Apr. 6, 2021

(54) WHOLLY AROMATIC LIQUID CRYSTALLINE POLYESTER RESIN, MOLDED ARTICLE, AND ELECTRIC AND ELECTRONIC COMPONENTS

(71) Applicant: JXTG NIPPON OIL & ENERGY CORPORATION, Tokyo (JP)

(72) Inventor: Gosuke Washino, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 16/498,664

(22) PCT Filed: Mar. 28, 2018

(86) PCT No.: PCT/JP2018/012868
§ 371 (c)(1),
(2) Date: Sep. 27, 2019

(87) PCT Pub. No.: WO2018/181525
PCT Pub. Date: Oct. 4, 2018

(65) Prior Publication Data
US 2020/0040133 A1 Feb. 6, 2020

(30) Foreign Application Priority Data
Mar. 28, 2017 (JP) .............................. JP2017-063735

(51) Int. Cl.
*C08G 63/60* (2006.01)
*B29C 45/00* (2006.01)
*B29K 67/00* (2006.01)

(52) U.S. Cl.
CPC ........ *C08G 63/605* (2013.01); *B29C 45/0001* (2013.01); *B29K 2067/04* (2013.01); *B29K 2995/0006* (2013.01)

(58) Field of Classification Search
USPC .......................... 528/190, 192, 193, 194, 196
See application file for complete search history.

(56) References Cited

U.S. PATENT DOCUMENTS

| | | | |
|---|---|---|---|
| 2004/0044169 A1 | 3/2004 | Yokota et al. | |
| 2009/0111926 A1 | 4/2009 | Yonezawa et al. | |

FOREIGN PATENT DOCUMENTS

| | | | |
|---|---|---|---|
| JP | 2002-179776 | 6/2002 | |
| JP | 2004-250620 | 9/2004 | |
| JP | 2006-1990 | 1/2006 | |
| JP | 2009-108191 | 5/2009 | |
| JP | 2015183159 A | * 10/2015 | |
| JP | 2017-179127 | 10/2017 | |
| WO | WO-2018008612 A1 | * 1/2018 | ........... C08G 63/605 |

OTHER PUBLICATIONS

JP-2015183159-A abstract, Kihara Masahiro (Year: 2015).*
WO 2018008612 abstract, Washino Gosuke (Year: 2018).*
International Preliminary Report on Patentability dated Oct. 10, 2019 in International Application No. PCT/JP2018/012868.
International Search Report dated Jun. 5, 2018 in International Application No. PCT/JP2018/012868.
Extended European Search Report dated Oct. 27, 2020 in corresponding European Application No. 18775501.2.

* cited by examiner

*Primary Examiner* — Terressa Boykin
(74) *Attorney, Agent, or Firm* — Wenderoth, Lind & Ponack, L.L.P.

(57) ABSTRACT

[Problem] To provide a wholly aromatic liquid crystalline polyester resin having an excellent heat resistance and processability while having an extremely low dielectric tangent

[Solving means] A wholly aromatic liquid crystalline polyester resin according to the present invention comprises, structural unit (I) derived from p-hydroxybenzoic acid, structural unit (II) derived from 6-hydroxy-2-naphthoic acid, structural unit (III) derived from an aromatic diol compound, structural unit (IV) derived from an aromatic dicarboxylic acid, wherein the composition ratio (mol %) of said structural units (I) to (IV) satisfies the following conditions:

2 mol % ≤ structural unit (I) ≤ 9 mol %

40 mol % ≤ structural unit (II) ≤ 75 mol %

9 mol % ≤ structural unit (III) ≤ 24 mol %

9 mol % ≤ structural unit (IV) 24 mol %.

16 Claims, 2 Drawing Sheets

WHOLLY AROMATIC LIQUID CRYSTALLINE POLYESTER RESIN, MOLDED ARTICLE, AND ELECTRIC AND ELECTRONIC COMPONENTS

TECHNICAL FIELD

The present invention relates to a wholly aromatic liquid crystalline polyester resin, in particular a wholly aromatic liquid crystalline polyester resin having an especially low dielectric tangent, a molded article comprising the wholly aromatic liquid crystalline polyester resin, and electric and electronic components comprising the molded article.

BACKGROUND ART

In recent years, use is increasing of signals having frequency of high frequency band in electronic and communication devices along with the increase of amount of information-communication traffic in the field of telecommunications, and especially the signals are extensively used having frequency of gigahertz (GHz) band, the frequency of which being $10^9$ Hz or more. For example, in the automobile field, high frequency band of GHz band is used. In particular, for millimeter wave radars and quasi-millimeter wave radars loaded for the purpose of crash prevention of the automobiles, there are used high frequencies of 76 to 79 GHz and 24 GHz, respectively, and those use are expected to grow further in the future.

However, the higher the frequency of the signal used, the lower becomes the quality of the emission signals which may cause erroneous recognition of information, i.e., the transmission loss becomes larger. This transmission loss consists of conductor loss due to a conductor and dielectric loss due to a resin for insulation which constitutes the electric and electronic components such as substrates in the electronic and communication devices, and since the conductor loss is proportional to 0.5 power of the frequency used and the dielectric loss to 1 power of the frequency, the effect due to this dielectric loss becomes extremely large in the high frequency band, particularly in the GHz band. In addition, since the dielectric loss also increases in proportion to the dielectric tangent of the resin, a resin having a low dielectric tangent performance is required for preventing degradation of information.

In relation to the above-described problem, Patent Document 1 proposes a liquid crystalline aromatic polyester comprising 2 or more of a structural unit derived from p- or m-hydroxybenzoic acid and a structural unit derived from hydroxynaphthoic acid as a liquid crystalline aromatic polyester which shows low dielectric tangent in the high frequency band.

The resin which constitutes the electric and electronic components is required to have a high heat resistance to the heat which occurs at the time of molding (film forming stability), and a molded article such as a film made by the use thereof has been required to have a high heat resistance to the heat treatment in which soldering and the like is used.

RELATED ART DOCUMENTS

Patent Documents

Patent Document 1 Japanese Laid-open Patent Application Publication No. 2004-250620

Patent Document 2 Japanese Laid-open Patent Application Publication No. 2002-179776

SUMMARY OF THE INVENTION

Problems to be Solved by the Invention

The present inventors have examined the performance of the wholly aromatic polyester resins with various compositions in the course of developing the wholly aromatic polyester resins well-balanced in heat resistance and processability while having a particularly low dielectric tangent. As a result, the use of polyester resin as proposed in Patent Document 2 for example was found to have insufficient processability into a film or a fiber. In particular, melt stretching property was found to be insufficient, which secures the processability and stretching processability when the resin is melted.

In order to solve the above-described problem, the present inventors intensively studied to find that a wholly aromatic liquid crystalline polyester resin having an excellent balance between the heat resistance and processability while having a notably low dielectric tangent is obtainable by adjusting the specific structural units to a specific composition ratio in the wholly aromatic liquid crystalline polyester resin.

The object of the present invention is to provide a wholly aromatic liquid crystalline polyester resin having an excellent balance between the heat resistance and processability while having a notably low dielectric tangent. Another object of the present invention is to provide a molded article comprising the wholly aromatic liquid crystalline polyester resin and electric and electronic components comprising the molded article.

Means for Solving the Problems

The wholly aromatic liquid crystalline polyester resin according to the present invention comprises, structural unit (I) derived from p-hydroxybenzoic acid, structural unit (II) derived from 6-hydroxy-2-naphthoic acid, structural unit (III) derived from an aromatic diol compound, structural unit (IV) derived from an aromatic dicarboxylic acid, wherein the composition ratio (mol %) of said structural units (I) to (IV) is characterized by satisfying the following conditions:

2 mol % ≤ structural unit (I) ≤ 9 mol %
40 mol % ≤ structural unit (II) ≤ 75 mol %
9 mol % ≤ structural unit (III) ≤ 24 mol %
9 mol % ≤ structural unit (IV) ≤ 24 mol %.

In one aspect of the present invention, preferably the composition ratio (mol %) of the structural units (I) to (IV) satisfies the following conditions:

2 mol % ≤ structural unit (I) ≤ 9 mol %
48 mol % ≤ structural unit (II) ≤ 70 mol %
10 mol % ≤ structural unit (III) ≤ 23 mol %
10 mol % ≤ structural unit (IV) ≤ 23 mol %.

In one aspect of the present invention, structural unit (III) is preferably represented by the following formula:

$$-\!\!-\!\!(\text{O}-\text{Ar}^1-\text{O})\!\!-\!\!-$$

wherein Ar¹ is selected from the group consisting of a phenyl group, a biphenyl group, a naphtyl group, an anthryl group, and a phenanthryl group, optionally having a substituent group.

In one aspect of the present invention, structural unit (IV) is preferably represented by the following formula:

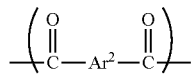

wherein Ar² is selected from the group consisting of a phenyl group, a biphenyl group, a naphtyl group, an anthryl group, and a phenanthryl group, optionally having a substituent group.

In one aspect of the present invention, the draw ratio of a melt strand extruded under the conditions in which the temperature is +20° C. the melting point of the liquid crystalline polyester resin and the shear rate is 1000 s⁻¹, is preferably 10 times or more.

In one aspect of the present invention, the dielectric tangent of the wholly aromatic liquid crystalline polyester resin in measurement frequency of 10 GHz is preferably 0.85×10⁻³ or less.

In one aspect of the present invention, the dielectric tangent of the wholly aromatic liquid crystalline polyester resin in measurement frequency of 82 GHz is preferably less than 3.5×10⁻³.

In one aspect of the present invention, the dielectric tangents at 30° C. and 100° C. of the wholly aromatic liquid crystalline polyester resin in measurement frequency of 34 GHz are less than 2.0×10⁻³ and less than 4.0×10⁻³ respectively.

In one aspect of the present invention, the change rate of the dielectric tangent from 30° C. to 100° C. of the wholly aromatic liquid crystalline polyester resin in measurement frequency 34 GHz is preferably less than 3.0×10⁻⁵/° C.

In one aspect of the present invention, the melting point of the wholly aromatic liquid crystalline polyester resin is preferably 290° C. or more.

In one aspect of the present invention, the melt viscosity at a temperature of +20° C. the melting point of the liquid crystalline polyester resin and the shear rate of 1000 s⁻¹, is preferably from 20 to 150 Pa·s.

The molded article according to the present invention is characterized in that it comprises the above-described wholly aromatic liquid crystalline polyester resin.

In one aspect of the present invention, the molded article is preferably in the form of a film.

In one aspect of the present invention, the molded article is preferably in the form of a fibre.

In one aspect of the present invention, the molded article is preferably an injection molded article.

The electric and electronic components according to the present invention are characterized in that the above-described molded article is comprised.

Effects of the Invention

According to the present invention, it is possible to attain a wholly aromatic liquid crystalline polyester resin having well-balanced properties of heat resistance and processability while having a notably low dielectric tangent by selecting specific structural units as the units forming the wholly aromatic liquid crystalline polyester resin and also by selecting a specific composition ratio thereof. That is to say, the use of a wholly aromatic liquid crystalline polyester resin according to the present invention will improve the heat resistance against heat treatment of the prepared molded article as well as film forming property and spinning stability. Therefore, it is possible to prevent the quality degradation of the emission signals in electric and electronic devices or telecommunication devices which use signals of high frequency when the molded articles are processed and molded and used as products. Also, the wholly aromatic polyester resin of the present invention also has a high spinning property and film forming stability, as well as being suitable for injection molding, and the molded article made by use thereof have high stability against heat treatment in which soldering and the like is used.

Figure 1:
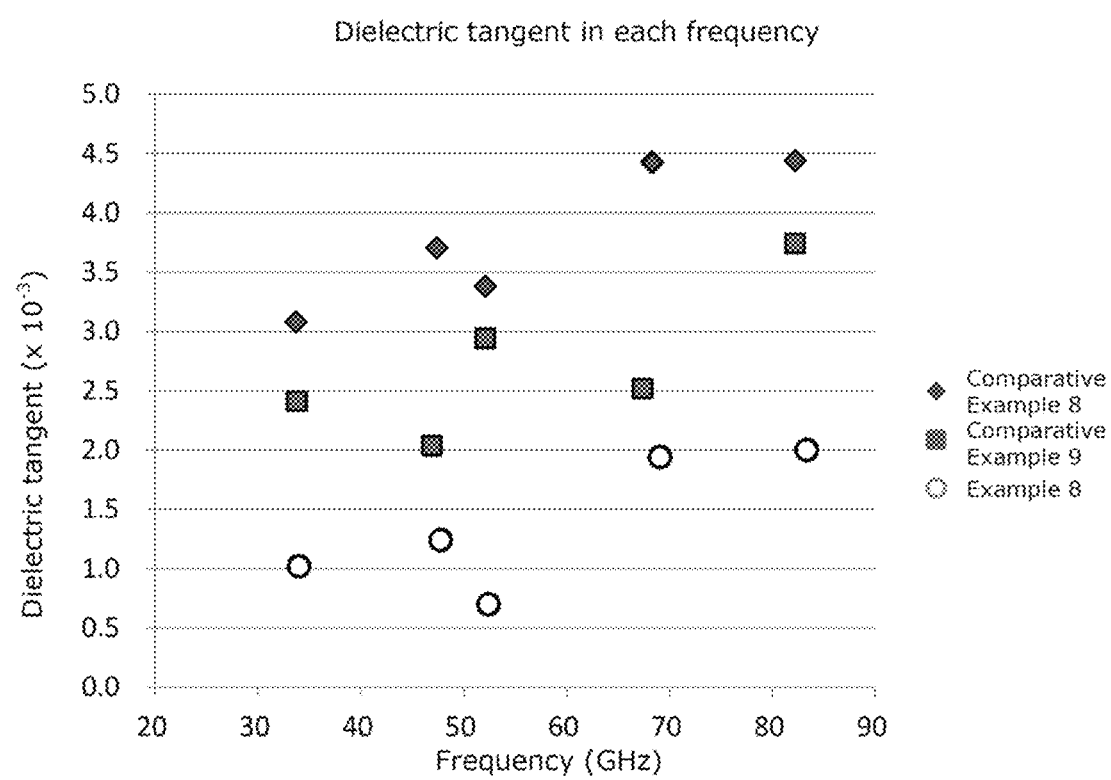
FIG. 1 shows the measurement results of the dielectric tangent in various GHz frequency of the wholly aromatic polyester resin.

MODE FOR CARRYING OUT THE INVENTION (Wholly Aromatic Liquid Crystalline Polyester Resin)

The wholly aromatic liquid crystalline polyester resin according to the present invention comprises structural unit (I) derived from p-hydroxybenzoic acid, structural unit (II) derived from 6-hydroxy-2-naphthoic acid, structural unit (III) derived from an aromatic diol compound, and structural unit (IV) derived from an aromatic dicarboxylic acid, wherein the composition ratio (mol %) of said structural units (I) to (IV) in the wholly aromatic liquid crystalline polyester resin satisfies the following conditions:

2 mol %≤structural unit (I)≤9 mol %
40 mol %≤structural unit (II)≤75 mol %
9 mol %≤structural unit (III)≤24 mol %
9 mol %≤structural unit (IV)≤24 mol %, and preferably the following conditions:
2 mol %≤structural unit (I)≤9 mol %
48 mol %≤structural unit (II)≤70 mol %
10 mol %≤structural unit (III)≤23 mol %
10 mol %≤structural unit (IV)≤23 mol %.

The composition ratio of structural unit (III) in the wholly aromatic liquid crystalline polyester resin is substantially equivalent to the composition ratio of structural unit (IV) (structural unit (III) # structural unit (IV)). The lower limit of the total structural units from (I) to (IV) is preferably 90 mol % or more, more preferably 95 mol % or more, and further preferably 99 mol % or more, and the upper limit is preferably 100 mol % or less, based on the structural units of the entire wholly aromatic liquid crystalline polyester resin.

According to the wholly aromatic liquid crystalline polyester resin having such constitution, an adequate melt stretching property will allow to impart stable processability into a fiber or a film. Also, it is possible to attain a wholly aromatic liquid crystalline polyester resin having a notably low dielectric tangent. Further, since the wholly aromatic liquid crystalline polyester resin can have a high melting point, it is possible to attain high heat resistance of the molded article prepared from the same against heat treatment.

Since it is also possible to produce a wholly aromatic polyester resin with a high glass transition temperature, the heat resistance in actual use of the molded article made by the use thereof can be improved, and it is also possible to attain use under an environment of higher temperatures. Moreover, it is possible to lower the volume expansion coefficient, whereby a wholly aromatic liquid crystalline polyester resin can be attained having a high dimension stability at the time of molding and processing.

The melt stretching property of the liquid crystalline polyester resin of the present invention can be evaluated by measuring the draw ratio of the melt strand. In view of the processability into a fiber or a film, the melt stretching property of the liquid crystalline polyester resin according to the present invention is such that the draw ratio (=withdrawing rate at the measurement end point (m/min)/extrusion rate converted as of capillary passing (m/min)) of the melt strand withdrawn while the withdrawing rate being accelerated by a winding roller via a pulley, the melt strand being extruded under the conditions in which the temperature is +20° C. the melting point of the liquid crystalline polyester resin and the shear rate is 1000 s$^{-1}$, is preferably 10 times or more and more preferably 15 times or more. In the present specification, the melt stretching property of the wholly aromatic liquid crystalline polyester resin can be measured by using CAPILOGRAPH 1D manufactured by Toyo Seiki Seisakusho, Ltd.

In view of the processability into a fiber or a film, tensile force (=melt tension) of the melt strand at the measurement end point is preferably 1 mN or more, more preferably 3 mN or more, and further more preferably 5 mN or more.

The dielectric tangent (measurement frequency: 10 GHz) of the wholly aromatic liquid crystalline polyester resin according to the present invention is preferably 0.85×10$^{-3}$ or less, more preferably 0.80×10$^{-3}$ or less, and further preferably 0.75×10$^{-3}$ or less.

The dielectric tangent (measurement frequency: 82 GHz) of the wholly aromatic liquid crystalline polyester resin according to the present invention is preferably less than 3.5×10$^{-3}$, more preferably less than 3.0×10$^{-3}$, and further preferably less than 2.5×10$^{-3}$.

The wholly aromatic liquid crystalline polyester resin according to the present invention preferably has dielectric tangents at 30° C. and 100° C. (measurement frequency: 34 GHz) of less than 2.0×10$^{-3}$ and less than 4.0×10$^{-3}$ respectively, more preferably of less than 1.5×10$^{-3}$ and less than 3.0×10$^{-3}$ respectively, and further preferably of less than 1.0×10$^{-3}$ and less than 2.0×10$^{-3}$ respectively.

Further, the change rate of the dielectric tangent from 30° C. to 100° C. in measurement frequency of 34 GHz is preferably less than 3.0×10$^{-5}$/° C., more preferably less than 2.2×10$^{-5}$/° C., and further preferably less than 1.5×10$^{-5}$/° C.

In the present specification, the dielectric tangent of the wholly aromatic liquid crystalline polyester resin in 10 GHz can be measured by split post dielectric resonator method (SPDR method) by means of Network Analyzer N5247A from Keysight Technologies. Measurements in other frequencies of the dielectric tangent can be carried out by means of cylindrical cavity resonator method. The value of the dielectric tangent is, unless otherwise specified, the value measured at 23° C., under ambient atmosphere, and humidity of 60%.

The lower limit of the melting point of the wholly aromatic liquid crystalline polyester resin according to the present invention is preferably 290° C. or more, more preferably 295° C. or more, further preferably 300° C. or more, and further more preferably 310° C. or more, and the upper limit is preferably 350° C. or less, more preferably 345° C. or less, and further preferably 340° C. or less. By selecting the melting point of the wholly aromatic liquid crystalline polyester resin according to the present invention within the above-described numerical range, it is possible to improve the film forming stability and the spinning stability and also to improve the heat resistance against heat treatment of the molded article prepared by using the same. In the present specification, the melting point of the wholly aromatic liquid crystalline polyester resin is in accordance with the test method of ISO11357, ASTM D3418 and can be measured by, for example, the differential scanning calorimeter (DSC) manufactured by Hitachi High-Tech Science Corporation.

In view of formability, melt viscosity of the liquid crystalline polyester resin according to the present invention has a lower limit of preferably 20 Pa·s or more and more preferably 30 Pa·s or more, and an upper limit of preferably 150 Pa·s or less, more preferably 125 Pa·s or less, and further preferably 100 Pa·s or less, under the temperature of +20° C. the melting point of the liquid crystalline polyester resin and the shear rate of 1000 s$^{-1}$. In the present specification, the melt viscosity of the wholly aromatic liquid crystalline polyester resin is in accordance with JIS K7199 and can be measured by using CAPILOGRAPH 1D manufactured by Toyo Seiki Seisaku-sho., Ltd.

Liquid crystallinity of the wholly aromatic liquid crystalline polyester resin according to the present invention can be confirmed by means of a polarizing microscope manufactured by Olympus Corporation (product name: BH-2) with a microscope heating stage manufactured by Mettler (product name: FP82HT), observing the presence/absence of optical anisotropy after heat melting the wholly aromatic liquid crystalline polyester resin on the microscope heating stage.

Each structural unit comprised in the wholly aromatic liquid crystalline polyester resin is explained below.

(Structural Unit (I) Derived from p-Hydroxybenzoic Acid)

The wholly aromatic liquid crystalline polyester resin comprises structural unit (I) derived from p-hydroxybenzoic acid which is expressed by formula (I) described below, and the composition ratio (mol %) of structural unit (I) in the wholly aromatic liquid crystalline polyester resin is 2 mol % to 9 mol %. In view of lowering the dielectric tangent and improvement of the melting point and processability of the wholly aromatic liquid crystalline polyester resin, the upper limit of the composition ratio (mol %) of structural unit (I) is preferably 8 mol % or less, more preferably 7 mol % or less, and further preferably 6 mol % or less.

(I)

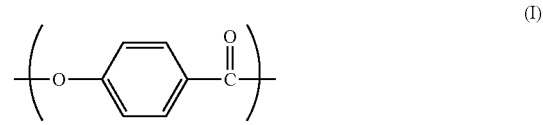

Monomers which give structural unit (I) include p-hydroxybenzoic acid (HBA, formula (1) as below), the acetylated product, ester derivative, acid halide thereof, and the like.

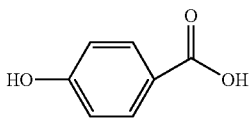
(1)

(Structural Unit (II) Derived from 6-Hydroxy-2-Naphthoic Acid)

The wholly aromatic liquid crystalline polyester resin comprises structural unit (II) derived from 6-hydroxy-2-naphthoic acid which is expressed by formula (II) described below, and the composition ratio (mol %) of structural unit (II) in the wholly aromatic liquid crystalline polyester resin is 40 mol % to 75 mol %. In view of lowering the dielectric tangent and improvement of the melting point and processability of the wholly aromatic liquid crystalline polyester resin, the lower limit of the composition ratio (mol %) of structural unit (II) is preferably 48 mol % or more, more preferably 50 mol % or more, further preferably 55 mol % or more, and further more preferably 57 mol % or more, and the upper limit is preferably 72 mol % or less, more preferably 70 mol % or less, and further preferably 65 mol % or less.

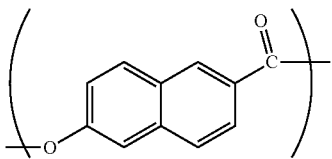
(II)

Monomers which give structural unit (II) include 6-hydroxy-2-naphthoic acid (HNA, formula (2) as described below), the acetylated product, ester derivative, acid halide thereof, and the like.

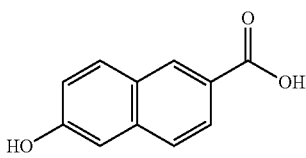
(2)

(Structural Unit (III) Derived from Aromatic Diol Compound)

The wholly aromatic liquid crystalline polyester resin comprises structural unit (III) derived from an aromatic diol compound, and the composition ratio (mol %) of structural unit (III) in the liquid crystalline polyester is 9 mol % to 24 mol %. In view of lowering the dielectric tangent and improvement of the melting point and processability of the wholly aromatic liquid crystalline polyester resin, the lower limit of the composition ratio (mol %) of structural unit (III) is preferably 10 mol % or more, more preferably 12 mol % or more, and further preferably 14 mol % or more, and the upper limit is preferably 23 mol % or less, and more preferably 22 mol % or less.

In one embodiment, structural unit (III) is represented by the following formula (III).

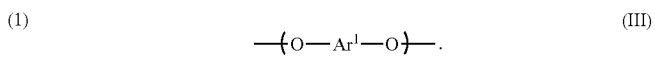
(III)

Ar$^1$ in the above-described formula is selected from the group consisting of a phenyl group, a biphenyl group, a naphtyl group, an anthryl group, and a phenanthryl group, optionally having a substituent group. Amongst these, the phenyl group and the biphenyl group are more preferable. The substituent group includes hydrogen, an alkyl group, an alkoxy group, and fluorine and the like. Number of carbons which the alkyl group has is preferably from 1 to 10 and more preferably from 1 to 5. The alkyl group may be straight chained or branched. Preferably, the alkoxy group has 1 to 10 carbons and more preferably 1 to 5 carbons.

Monomers which give structural unit (III) include for example, 4,4-dihydroxybiphenyl (BP, formula (3) as below), hydroquinone (HQ, formula (4) as below), methylhydroquinone (MeHQ, formula (5) as below), and the acylated products thereof.

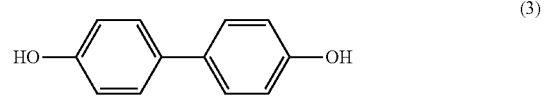
(3)

(4)

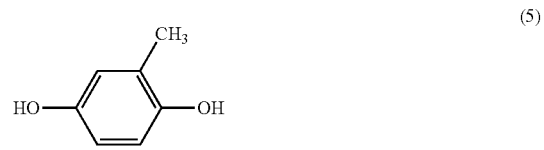
(5)

(Structural Unit (IV) Derived from Aromatic Dicarboxylic Acid)

The wholly aromatic liquid crystalline polyester resin comprises structural unit (IV) derived from an aromatic dicarboxylic acid, and the composition ratio (mol %) of structural unit (IV) in the liquid crystalline polyester is 9 mol % to 24 mol %. In view of lowering the dielectric tangent and improvement of the melting point and processability of the wholly aromatic liquid crystalline polyester resin, the lower limit of the composition ratio (mol %) of structural unit (IV) is preferably 10 mol % or more, more preferably 12 mol % or more, and further preferably 14 mol % or more, and the upper limit is preferably 23 mol % or less, and more preferably 22 mol % or less.

In one embodiment, structural unit (IV) is represented by the following formula (IV).

(IV)

Ar$^2$ in the above-described formula is selected from the group consisting of a phenyl group, a biphenyl group, a naphtyl group, an anthryl group, and a phenanthryl group, optionally having a substituent group. Amongst these, the phenyl group is more preferable. The substituent group includes hydrogen, an alkyl group, an alkoxy group, and fluorine and the like. Number of carbons which the alkyl group has is preferably from 1 to 10 and more preferably from 1 to 5. The alkyl group may be straight chained or branched. Preferably, the alkoxy group has 1 to 10 carbons and more preferably 1 to 5 carbons.

Monomers which give structural unit (IV) include for example, terephthalic acid (TPA, formula (6) as below), isophthalic acid (IPA, formula (7) as below), 2,6-naphtalene dicarboxylic acid (NADA, formula (8) as below), and ester derivatives, acid halides thereof and the like. The monomer which gives structural unit (IV) is preferably a single monomer, and when 2 or more of the monomers are combined, the proportion of the main monomer is preferably 65% or more, more preferably 70% or more, and further preferably 80 mol % or more.

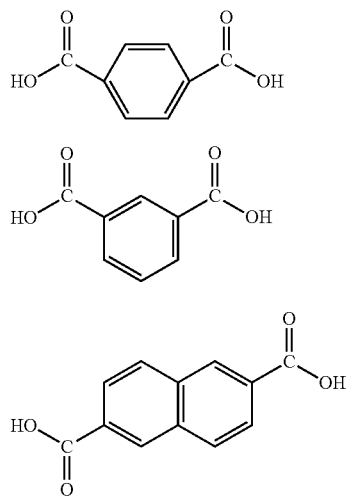

(Method for Manufacturing Wholly Aromatic Liquid Crystalline Polyester Resin)

The wholly aromatic liquid crystalline polyester resin according to the present invention can be prepared by polymerization of the monomers giving structural units (I) to (IV) with conventionally known methods such as melt polymerization, solid state polymerization, solution polymerization, and slurry polymerization. In one embodiment, the wholly aromatic liquid crystalline polyester resin according to the present invention can only be prepared by melt polymerization. Preparation is also possible by a two-stage polymerization in which melt polymerization is carried out which gives a prepolymer which is further subjected to solid state polymerization.

In view of obtaining the polyester compound according to the present invention in an efficient manner, the melt polymerization is preferably carried out in the presence of 1.05 to 1.15 mol equivalent of acetic anhydride based on the total hydroxyl groups which the monomers have and under acetic acid reflux, the monomers giving the above-described structural units (I) to (IV) being incorporated in prescribed combination to make 100 mol %.

When polymerization reaction is performed in two-stages of melt polymerization followed by solid state polymerization, the prepolymer obtained by melt polymerization is cooled and solidified, subsequently triturated into a powder form or a flake form, and then preferably, a known solid state polymerization method is taken, the example of the method involving thermal treatment of the prepolymer resin for 1 to 30 hours at a temperature range from 200 to 350° C. under an inert atmosphere such as nitrogen or under vacuum. The solid state polymerization may be carried out while stirring or in a static state without stirring.

The polymerization reaction may be carried out with or without the use of a catalyst. The catalyst used can be those conventionally known as a catalyst for polymerization of polyester, including metal salt catalysts such as magnesium acetate, tin (I) acetate, tetrabutyl titanate, lead acetate, sodium acetate, potassium acetate, antimony trioxide, and organic compound catalysts such as nitrogen containing heterocyclic compounds such as N-methyl imidazole. The amount of catalysts used is preferably, without particular limitation, 0.0001 to 0.1 parts by weight based on the total amount of 100 parts by weight of the monomers.

The polymerization reactor used in the melt polymerization is preferably, without particular limitation, a reactor used for reaction of a general highly viscous fluid. Examples of these reactors include types of anchor, multi-stage, spiral band, spiral shaft, and the like, or stirred tank polymerization reactors equipped with a stirrer having stirring blades in various shapes formed by modifying such types, or mixing devices which are generally used for kneading resins such as a kneader, a roll mill, a bunbury mixer, and the like.

(Molded Article)

A molded article according to the present invention comprises the wholly aromatic liquid crystalline polyester resin, and the shape thereof is appropriately changed depending on the application, examples being, without particular limitation, in the form of a film, a plate, a fiber, and the like.

The molded article according to the present invention may comprise other resins than the wholly aromatic liquid crystalline polyester resin, as long as the effect of the present invention is not compromised. Examples include, polyester resins such as polyethylene terephthalate, polyethylene naphtalate, polyarylate, and polybutyrene terephthalate, polyolefin resins such as polyethylene and polypropylene, vinyl resins such as cycloolefin polymer and polyvinylchloride, (meth) acryl resins such as polyacrylate, polymethacrylate, and polymethyl methacrylate, polyphenylene ether resin, polyacetal resin, polyamide resin, imide resins such as polyimide and polyether imide, polystyrene resins such as polystyrene, high-impact polystyrene, AS resin and ABS resin, thermosetting resin such as epoxy resin, cellulose resin, polyether ether ketone resin, fluorine resin and polycarbonate resin, and the molded article may comprise one or two or more of these.

The molded article according to the present invention may comprise other additives, for example, a colorant, a dispersing agent, a plasticizer, an antioxidant, a curing agent, a flame retardant, a heat stabilizer, a UV absorber, an antistat, and a surfactant, as long as the effect of the present invention is not compromised.

The molded article according to the present invention can be obtained by subjecting a mixture comprising the wholly aromatic liquid crystalline polyester resin and optionally other resins or additives to press molding, foam molding, injection molding, extrusion molding, and punch molding. The mixture can be obtained by melt kneading the wholly aromatic liquid crystalline polyester resin, etc., by using a banbury mixer, a kneader, a single or twin screw extruder, and the like.

In one embodiment, the molded article is preferably in a film form. The film can be obtained by a conventionally known method, for example, extrusion molding such as inflation molding and melt extrusion molding, and solution casting method. The film thus obtained may be a single layered film consisted of the wholly aromatic liquid crystalline polyester resin, or may be a multi-layered film with different kinds of materials. The molded films by melt extrusion or solution casting may be subjected to stretching process in a single or twin screw, for the purpose of improving the dimension stability and mechanical properties. Thermal treatment may be carried out for the purpose of removing anisotropy or improving the heat resistance of the film.

In one embodiment, the molded article is preferably in a fiber form. Fibers can be obtained by conventionally known methods such as by melt spinning method, solution spinning method, and the like. The fibers may be made solely of the wholly aromatic liquid crystalline polyester resin, or may be mixed with other resins.

(Electric and Electronic Components)

Electric and electronic components according to the present invention comprise the above-described molded article, examples of which being an antenna, a high-speed transmission connector, a CPU socket, a circuit board, a flexible printed circuit board (FPC), a circuit board for lamination, a millimeter wave or a quasi-millimeter radar such as a radar for collision prevention, RFID tag, a condenser, an inverter part, an insulation film, a coating material for a cable, an insulation material of a secondary battery such as a lithium-ion battery, a vibrating plate of a speaker used in electronic devices and telecommunication devices such as ETC, GPS, wireless LAN and a mobile phone, and the like. In one embodiment, the electric and electronic components comprise a molded article (e.g., an injection molded article or a film, etc.) which comprises the wholly aromatic liquid crystalline polyester resin.

EXAMPLES

In the followings, the present invention will be described in more details by the Examples; however, the present invention shall not be limited to the Examples.

Preparation of Wholly Aromatic Liquid Crystalline Polyester Resin

Example 1

To a polymerization vessel with stirring blades, 5 mol % of p-hydroxybenzoic acid (HBA), 48 mol % of 6-hydroxy-2-naphthoic acid (HNA), 23.5 mol % of 4,4-dihydroxybiphenyl (BP), 23.5 mol % of terephthalic acid (TPA) were added, and potassium acetate and magnesium acetate were fed as catalysts, and after carrying out nitrogen substitution by reducing the pressure of the polymerization vessel and injecting nitrogen for 3 times, acetic anhydride was further added (1.08 mol equivalent based on a hydroxyl group), the temperature elevated to 150° C., and acetylation reaction was performed for 2 hours under reflux state.

After termination of acetylation, the polymerization vessel made into a state where acetic acid was distilled out was subjected to temperature elevation at 0.5° C./min, and the polymerization product was taken out when the temperature of the melt product in the vessel reached 300° C., and cooled to solidify. The obtained polymerization product was triturated into the size which will pass through a sieve having a sieve opening of 2.0 mm to obtain a prepolymer.

Then, the prepolymer obtained as above was subjected to temperature elevation from room temperature to 300° C. over 14 hours by using a heating machine with an oven manufactured by Yamato Scientific Co., Ltd, and subsequently, the temperature was kept at 300° C. for 2 hours to carry out solid state polymerization. Subsequently, heat was naturally released at room temperature to obtain a wholly aromatic liquid crystalline polyester resin. The wholly aromatic liquid crystalline polyester resin specimen was heat melted on a microscope heating stage by using a polarization microscope manufactured by Olympus Corporation (product name: BH-2) with a hot stage for microscopes manufactured by Mettler (product name: FP82HT) to confirm liquid crystallinity by the presence/absence of optical anisotropy.

Example 2

Liquid crystalline polyester resin was obtained in a similar manner as Example 1, except that the monomer feed was changed to HBA 3 mol %, HNA 54 mol %, BP 21.5 mol %, and TPA 21.5 mol %, and then liquid crystalline property was confirmed in a similar manner as above.

Example 3

Liquid crystalline polyester resin was obtained in a similar manner as Example 1, except that the monomer feed was changed to HBA 6 mol %, HNA 54 mol %, BP 20 mol %, and TPA 20 mol %, and then liquid crystalline property was confirmed in a similar manner as above.

Example 4

Liquid crystalline polyester resin was obtained in a similar manner as Example 1, except that the monomer feed was changed to HBA 3 mol %, HNA 55 mol %, BP 21 mol %, and TPA 21 mol %, and then liquid crystalline property was confirmed in a similar manner as above.

Example 5

Liquid crystalline polyester resin was obtained in a similar manner as Example 1, except that the monomer feed was changed to HBA 5 mol %, HNA 55 mol %, BP 20 mol %, and TPA 20 mol %, and then liquid crystalline property was confirmed in a similar manner as above.

Example 6

Liquid crystalline polyester resin was obtained in a similar manner as Example 1, except that the monomer feed was changed to HBA 8 mol %, HNA 55 mol %, BP 18.5 mol %, and TPA 18.5 mol %, and then liquid crystalline property was confirmed in a similar manner as above.

Example 7

Liquid crystalline polyester resin was obtained in a similar manner as Example 1, except that the monomer feed was changed to HBA 5 mol %, HNA 57 mol %, BP 19 mol %, and TPA 19 mol %, and then liquid crystalline property was confirmed in a similar manner as above.

Example 8

Liquid crystalline polyester resin was obtained in a similar manner as Example 1, except that the monomer feed was changed to HBA 2 mol %, HNA 60 mol %, BP 19 mol %, and TPA 19 mol %, and then liquid crystalline property was confirmed in a similar manner as above.

Example 9

Liquid crystalline polyester resin was obtained in a similar manner as Example 1, except that the monomer feed was changed to HBA 3 mol %, HNA 60 mol %, BP 18.5 mol %, and TPA 18.5 mol %, and then liquid crystalline property was confirmed in a similar manner as above.

Example 10

Liquid crystalline polyester resin was obtained in a similar manner as Example 1, except that the monomer feed was changed to HBA 5 mol %, HNA 60 mol %, BP 17.5 mol %, and TPA 17.5 mol %, and the retention time at 300° C. was changed to 1 hour, and then liquid crystalline property was confirmed in a similar manner as above.

Example 11

Liquid crystalline polyester resin was obtained in a similar manner as Example 1, except that the monomer feed was changed to HBA 8 mol %, HNA 60 mol %, BP 16 mol %, and TPA 16 mol %, the final temperature of solid state polymerization was changed to 295° C., and the retention time was changed to 1 hour, and then liquid crystalline property was confirmed in a similar manner as above.

Example 12

Liquid crystalline polyester resin was obtained in a similar manner as Example 1, except that the monomer feed was changed to HBA 2 mol %, HNA 65 mol %, BP 16.5 mol %, and TPA 16.5 mol %, and the retention time at 300° C. was changed to 1 hour, and then liquid crystalline property was confirmed in a similar manner as above.

Example 13

Liquid crystalline polyester resin was obtained in a similar manner as Example 1, except that the monomer feed was changed to HBA 2 mol %, HNA 65 mol %, BP 14.5 mol %, methyl hydroquinone (MeHQ) 2 mol %, and TPA 16.5 mol %, the final temperature of solid state polymerization was changed to 295° C., and the retention time was changed to 1 hour, and then liquid crystalline property was confirmed in a similar manner as above.

Example 14

Liquid crystalline polyester resin was obtained in a similar manner as Example 1, except that the monomer feed was changed to HBA 5 mol %, HNA 65 mol %, BP 15 mol %, and TPA 15 mol %, and the retention time at 300° C. was changed to 1 hour, and then liquid crystalline property was confirmed in a similar manner as above.

Example 15

Liquid crystalline polyester resin was obtained in a similar manner as Example 1, except that the monomer feed was changed to HBA 5 mol %, HNA 65 mol %, BP 15 mol %, TPA 13 mol %, and 2,6-naphtalene dicarboxylic acid (NADA) 2 mol %, the final temperature of solid state polymerization was changed to 295° C., and the retention time was changed to 1 hour, and then liquid crystalline property was confirmed in a similar manner as above.

Example 16

Liquid crystalline polyester resin was obtained in a similar manner as Example 1, except that the monomer feed was changed to HBA 5 mol %, HNA 65 mol %, BP 15 mol %, TPA 14 mol %, and NADA 1 mol %, the final temperature of solid state polymerization was changed to 295° C., and the retention time was changed to 1 hour, and then liquid crystalline property was confirmed in a similar manner as above.

Example 17

Liquid crystalline polyester resin was obtained in a similar manner as Example 1, except that the monomer feed was changed to HBA 5 mol %, HNA 65 mol %, BP 15 mol %, TPA 10 mol %, and NADA 5 mol %, the final temperature of solid state polymerization was changed to 295° C., and the retention time was changed to 1 hour, and then liquid crystalline property was confirmed in a similar manner as above.

Example 18

Liquid crystalline polyester resin was obtained in a similar manner as Example 1, except that the monomer feed was changed to HBA 8 mol %, HNA 65 mol %, BP 13.5 mol %, and TPA 13.5 mol %, the final temperature of solid state polymerization was changed to 295° C., and the retention time was changed to 1 hour, and then liquid crystalline property was confirmed in a similar manner as above.

Example 19

Liquid crystalline polyester resin was obtained in a similar manner as Example 1, except that the monomer feed was changed to HBA 3 mol %, HNA 68 mol %, BP 14.5 mol %, and TPA 14.5 mol %, and then liquid crystalline property was confirmed in a similar manner as above.

Example 20

Liquid crystalline polyester resin was obtained in a similar manner as Example 1, except that the monomer feed was changed to HBA 6 mol %, HNA 68 mol %, BP 13 mol %, and TPA 13 mol %, and then liquid crystalline property was confirmed in a similar manner as above.

Example 21

Liquid crystalline polyester resin was obtained in a similar manner as Example 1, except that the monomer feed was changed to HBA 5 mol %, HNA 70 mol %, BP 12.5 mol %, and TPA 12.5 mol %, and the retention time at 300° C. was changed to 1 hour, and then liquid crystalline property was confirmed in a similar manner as above.

Example 22

Liquid crystalline polyester resin was obtained in a similar manner as Example 1, except that the monomer feed was changed to HBA 9 mol %, HNA 72 mol %, BP 9.5 mol %, and TPA 9.5 mol %, the final temperature of solid state polymerization was changed to 280° C., and the retention time was changed to 1 hour, and then liquid crystalline property was confirmed in a similar manner as above.

Comparative Example 1

Liquid crystalline polyester resin was obtained in a similar manner as Example 1, except that the monomer feed was changed to HBA 6 mol %, HNA 40 mol %, BP 27 mol %, and TPA 27 mol %, and the final temperature of solid state polymerization was changed to 305° C., and then liquid crystalline property was confirmed in a similar manner as above.

Comparative Example 2

Liquid crystalline polyester resin was obtained in a similar manner as Example 1, except that the monomer feed was changed to HBA 2 mol %, HNA 48 mol %, BP 25 mol %, and TPA 25 mol %, and the final temperature of solid state polymerization was changed to 310° C., and then liquid crystalline property was confirmed in a similar manner as above.

Comparative Example 3

Liquid crystalline polyester resin was obtained in a similar manner as Example 1, except that the monomer feed was changed to HBA 1 mol %, HNA 54 mol %, BP 22.5 mol %, and TPA 22.5 mol %, and the final temperature of solid state polymerization was changed to 310° C., and then liquid crystalline property was confirmed in a similar manner as above.

Comparative Example 4

Liquid crystalline polyester resin was obtained in a similar manner as Example 1, except that the monomer feed was changed to HBA 1 mol %, HNA 60 mol %, BP 19.5 mol %, and TPA 19.5 mol %, and the final temperature of solid state polymerization was changed to 305° C., and the retention time was changed to 1 hour, and then liquid crystalline property was confirmed in a similar manner as above.

Comparative Example 5

Liquid crystalline polyester resin was obtained in a similar manner as Example 1, except that the monomer feed was changed to HBA 10 mol %, HNA 65 mol %, BP 12.5 mol %, and TPA 12.5 mol %, and the final temperature of solid state polymerization was changed to 290° C., and the retention time was changed to 1 hour, and then liquid crystalline property was confirmed in a similar manner as above.

Comparative Example 6

Liquid crystalline polyester resin was obtained in a similar manner as Example 1, except that the monomer feed was changed to HBA 10 mol %, HNA 70 mol %, BP 10 mol %, and TPA 10 mol %, and the final temperature of solid state polymerization was changed to 290° C., and the retention time was changed to 1 hour, and then liquid crystalline property was confirmed in a similar manner as above.

Comparative Example 7

Liquid crystalline polyester resin was obtained in a similar manner as Example 1, except that the monomer feed was changed to HBA 8 mol %, HNA 75 mol %, BP 8.5 mol %, and TPA 8.5 mol %, and then liquid crystalline property was confirmed in a similar manner as above.

Comparative Example 8

Liquid crystalline polyester resin was obtained in a similar manner as Example 1, except that the monomer feed was changed to HNA 60 mol %, BP 20 mol %, TPA 15 mol %, and isophtalic acid (IPA) 5 mol %, and then liquid crystalline property was confirmed in a similar manner as above.

Comparative Example 9

Liquid crystalline polyester resin was obtained in a similar manner as Example 1, except that the monomer feed was changed to HBA 73 mol % and HNA 27 mol % and the final temperature of solid state polymerization was changed to 270° C., and then liquid crystalline property was confirmed in a similar manner as above.

<<Performance Evaluation>>

<Measurement of Melt Stretching Property/Melt Tension>

Melt stretching property of the wholly aromatic liquid crystalline polyester resins obtained from the Examples and Comparative Examples were evaluated by measuring the draw ratio of the melt strands. By means of CAPILOGRAPH 1D manufactured by Toyo Seiki Seisaku-sho., Ltd. (a rheometer with a barrel inner diameter of 9.55 mm), capillary with inner diameter of 1 mm, the resin melted under the condition in which the temperature was +20° C. the melting point of the liquid crystalline polyester resin and the extrusion rate of the plunger was 82.3 mm/min (=extrusion rate when the shear rate applied to the resin when passing capillary is 1000 s$^{-1}$) was extruded as a strand. The extruded melt strand was measured with a wind-up roller via a pulley for the withdrawing and draw ratio (=withdrawing rate at the end point of measurement (m/min)/extrusion rate converted into the time when passing capillary (m/min)). With respect to the withdrawing rate, the end point of measurement was obtained from the point where the withdrawing rate reached the measuring limit of the device of 200 m/min or the point where the strand broke, upon elevating the withdrawing rate at a rate of 400 m/min from the initial rate of 40 m/min. These measurement results are summarized in Table 1. Also, the tensile force (=melt tension) of the melt strands at the end point of measurement is summarized in Table 1. Those of which the melt strand could not be appropriately set up on the series of pulley and the wind-up roller due to lack of the melt stretching property, melt viscosity, or melt tension, or which measurement was not possible because the melt stretching property was below the measuring limit of the device were indicated as "–".

<Measurement of Dielectric Tangent (10 GHz)>

The wholly aromatic liquid crystalline polyester resins obtained from the Examples and Comparative Examples were heat melted and injection molded at a condition in which the temperature was from the melting point to +30° C. the melting point to make flat plate test specimens of 30 mm×30 mm×0.4 mm. With respect to the dielectric tangent in the in-plane direction of these specimens, dielectric tangent of frequency of 10 GHz was measured by a split post dielectric resonator method (SPDR method), using Network Analyzer N5247A from Keysight Technologies. The measured results are summarized in Table 1. One of which the polymer melted during solid state polymerization due to the low melting point (Comparative Example 5) was not able to be injection molded and therefore determined as unmeasurable and indicated as "–".

<Measurement of Dielectric Tangent (82 GHz Etc.)>

The wholly aromatic liquid crystalline polyester resins obtained from Example 8 and Comparative Examples 8 and 9 were heat melted and injection molded at a condition in which the temperature was from the melting point to +30° C. the melting point to make flat plate samples of 30 mm×30 mm×0.4 mm. Subsequently, square flat plates in 13 mm square were cut from the center of these flat plate samples to make test specimens. These test specimens were loaded on to a resonator for 100 GHz at Graduate School of Engineering, Utsunomiya University, Kogami Lab. & Shimizu Lab., and by cylindrical cavity resonator method, the dielectric tangent of frequency of 82 GHz was measured at room temperature. (Although a resonator for 100 GHz was used, the actual measurement frequency was at around 82 GHz due to the resonance property of the material). The measured results are summarized in Table 2. Also, the dielectric tangent measured at various frequencies in the similar procedure by using a cylindrical cavity resonator with different set up frequencies is shown in FIG. 1.

<Measurement of Dielectric Tangent (Temperature Dependency in GHz Area)>

Figure 2:
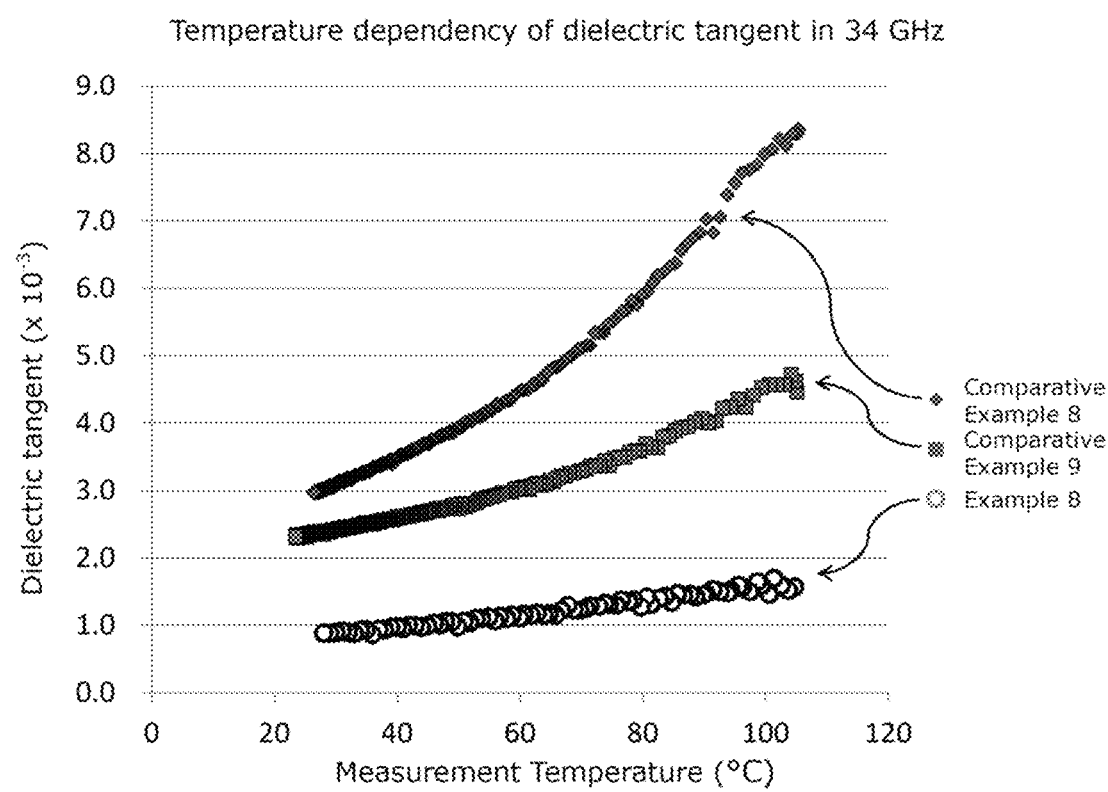
FIG. 2 shows the measurement results of the dielectric tangent of the wholly aromatic polyester resin in 34 GHz (temperature dependency from 30° C. to 100° C.).

The wholly aromatic liquid crystalline polyester resins obtained from Example 8 and Comparative Examples 8 and 9 were heat melted and injection molded at a condition in which the temperature was from the melting point to melting point+30° C. to make flat plate samples of 30 mm×30 mm×0.4 mm. Subsequently, square flat plates in 13 mm square were cut from the center of these flat plate samples to make test specimens. These test specimens were loaded on to a resonator for 36 GHz at Graduate School of Engineering Utsunomiya University, Kogami Lab. & Shimizu Lab., and by cylindrical cavity resonator method, the dielectric tangent of frequency of 34 GHz was measured while changing the measuring temperature. (Although a resonator for 36 GHz was used, the actual measurement frequency was at 34 GHz due to the resonance property of the material). The detailed measuring method is as follows. The resonator to which the specimen was set was placed in a constant-temperature tank, and after setting the set-up temperature of the constant-temperature tank to 105° C., the tank was left to stand for 2 hours. Thereafter, the constant-temperature tank was set to 20° C. and the inner temperature of the tank was left to naturally fall, and the dielectric tangent was measured this time at every 1° C. The results are shown in FIG. 2. Further, the dielectric tangent at 30° C. and 100° C. and the change rate of dielectric tangent from 30° C. to 100° C. are shown in Table 3.

<Measurement of Melting Point>

The melting points of the wholly aromatic liquid crystalline polyester resins obtained in the Examples and Comparative Examples were measured by a differential scanning calorimeter (DSC) manufactured by Hitachi High-Tech Science Corporation. Here, the melting point ($Tm_2$) was determined from an endotherm peak which was obtained when the temperature was elevated from room temperature to 360-380° C. at a temperature increasing rate of 10° C./min to melt the polymer completely, and subsequently lowered to 30° C. at a rate of 10° C./min, and further elevated to 380° C. at a rate of 10° C./min. However, when the endotherm peak at re-heating was difficult to be detected due to its broadness, the peak of the endotherm peak of the first round ($Tm_1$) was determined as the melting point (t). The measured results are summarized in Table 1.

<Measurement of Melt Viscosity>

The melt viscosity (Pa·s) at a temperature of +20° C. the melting point in a shear rate of 1000 $s^{-1}$ of the wholly aromatic liquid crystalline polyester resins obtained from the Examples and Comparative Examples were measured in accordance with JIS K7199 by using a capillary rheometer viscometer (CAPILOGRAPH 1D manufactured by Toyo Seiki Seisaku-sho., Ltd.) and capillary with inner diameter of 1 mm. The measured results are summarized in Table 1.

TABLE 1

| | Composition (mol %) | | | | | | Performance evaluation | | | | |
|---|---|---|---|---|---|---|---|---|---|---|---|
| | Structural unit (I) | Structural unit (II) | Structural unit (III) | | Structural unit (IV) | | | Melt stretching property (draw ratio) | Melt tension (mN) | Dielectric tangent (×10$^{-3}$) [10 GHz] | Melting point (° C.) | Melt viscosity (Pa·s) |
| | HBA | HNA | BP | MeHQ | TPA | NADA | IPA | | | | | |
| Example 1 | 5 | 48 | 23.5 | — | 23.5 | — | — | 24 | 1 | 0.83 | 334 | 20 |
| Example 2 | 3 | 54 | 21.5 | — | 21.5 | — | — | 23 | 2 | 0.73 | 339 | 23 |
| Example 3 | 6 | 54 | 20 | — | 20 | — | — | 16 | 20 | 0.70 | 317 | 75 |
| Example 4 | 3 | 55 | 21 | — | 21 | — | — | 27 | 17 | 0.65 | 323 | 94 |
| Example 5 | 5 | 55 | 20 | — | 20 | — | — | 25 | 7 | 0.70 | 336 | 41 |
| Example 6 | 8 | 55 | 18.5 | — | 18.5 | — | — | 12 | 24 | 0.71 | 304 | 96 |
| Example 7 | 5 | 57 | 19 | — | 19 | — | — | 11 | 25 | 0.67 | 321 | 91 |
| Example 8 | 2 | 60 | 19 | — | 19 | — | — | 27 | 3 | 0.70 | 339 | 25 |
| Example 9 | 3 | 60 | 18.5 | — | 18.5 | — | — | 27 | 7 | 0.65 | 332 | 37 |
| Example 10 | 5 | 60 | 17.5 | — | 17.5 | — | — | 27 | 12 | 0.74 | 317 | 64 |
| Example 11 | 8 | 60 | 16 | — | 16 | — | — | 27 | 12 | 0.75 | 299 | 77 |
| Example 12 | 2 | 65 | 16.5 | — | 16.5 | — | — | 25 | 5 | 0.75 | 336 | 24 |
| Example 13 | 2 | 65 | 14.5 | 2 | 16.5 | — | — | 27 | 17 | 0.68 | 321 | 58 |
| Example 14 | 5 | 65 | 15 | — | 15 | — | — | 27 | 12 | 0.70 | 315 | 52 |
| Example 15 | 5 | 65 | 15 | — | 13 | 2 | — | 15 | 43 | 0.69 | 305 | 89 |
| Example 16 | 5 | 65 | 15 | — | 14 | 1 | — | 27 | 65 | 0.69 | 310 | 80 |
| Example 17 | 5 | 65 | 15 | — | 10 | 5 | — | 13 | 48 | 0.67 | 295 | 125 |
| Example 18 | 8 | 65 | 13.5 | — | 13.5 | — | — | 10 | 46 | 0.73 | 297 | 87 |
| Example 19 | 3 | 68 | 14.5 | — | 14.5 | — | — | 27 | 17 | 0.56 | 331 | 57 |
| Example 20 | 6 | 68 | 13 | — | 13 | — | — | 11 | 51 | 0.57 | 311 | 150 |
| Example 21 | 5 | 70 | 12.5 | — | 12.5 | — | — | 9 | 32 | 0.68 | 317 | 89 |
| Example 22 | 9 | 72 | 9.5 | — | 9.5 | — | — | 27 | 12 | 0.70 | 302 | 42 |
| Comparative | 6 | 40 | 27 | — | 27 | — | — | — | — | 1.18 | 344* | 10 |

TABLE 1-continued

| | Composition (mol %) | | | | | | | Performance evaluation | | | | |
|---|---|---|---|---|---|---|---|---|---|---|---|---|
| | Structural unit (I) | Structural unit (II) | Structural unit (III) | | Structural unit (IV) | | | Melt stretching property (draw ratio) | Melt tension (mN) | Dielectric tangent ($\times 10^{-3}$) [10 GHz] | Melting point (°C.) | Melt viscosity (Pa·s) |
| | HBA | HNA | BP | MeHQ | TPA | NADA | IPA | | | | | |
| Example 1 | | | | | | | | | | | | |
| Comparative Example 2 | 2 | 48 | 25 | — | 25 | — | — | — | — | 0.72 | 356 | 26 |
| Comparative Example 3 | 1 | 54 | 22.5 | — | 22.5 | — | — | — | — | 0.66 | 355 | 14 |
| Comparative Example 4 | 1 | 60 | 19.5 | — | 19.5 | — | — | — | — | 0.69 | 348 | 21 |
| Comparative Example 5 | 10 | 65 | 12.5 | — | 12.5 | — | — | — | — | — | 287 | 94 |
| Comparative Example 6 | 10 | 70 | 10 | — | 10 | — | — | — | — | 0.87 | 307* | 26 |
| Comparative Example 7 | 8 | 75 | 8.5 | — | 8.5 | — | — | — | — | 0.55 | 334* | 152 |
| Comparative Example 8 | 60 | — | 20 | — | 15 | — | 5 | — | — | 2.30 | 355 | 35 |
| Comparative Example 9 | 73 | 27 | — | — | — | — | — | 27 | 25 | 1.70 | 289 | 72 |

*Value of $Tm_1$ is shown.

TABLE 2

| | Dielectric tangent ($\times 10^{-3}$) [82 GHz] |
|---|---|
| Example 8 | 2.0 |
| Comparative Example 8 | 4.4 |
| Comparative Example 9 | 3.7 |

TABLE 3

| | Dielectric tangent ($\times 10^{-3}$) [34 GHz] | | Dielectric tangent [34 GHz] Change rate at 30° C. and 100° C. ($\times 10^{-5}$/°C.) |
|---|---|---|---|
| | 30° C. | 100° C. | |
| Example 8 | 0.9 | 1.5 | 0.8 |
| Comparative Example 8 | 3.1 | 8.0 | 7.0 |
| Comparative Example 9 | 2.4 | 4.6 | 3.0 |

The invention claimed is:

1. A wholly aromatic liquid crystalline polyester resin comprising,
   a polymer prepared by polymerization of monomers giving the following structural units (I), (II), (III), and (IV):
   structural unit (I) derived from p-hydroxybenzoic acid,
   structural unit (II) derived from 6-hydroxy-2-naphthoic acid,
   structural unit (III) derived from an aromatic diol compound,
   structural unit (IV) derived from an aromatic dicarboxylic acid, wherein
   the composition ratio (mol %) of said structural units (I) to (IV) satisfies the following conditions:
   2 mol %≤structural unit (I)≤9 mol %
   40 mol %≤structural unit (II)≤75 mol %
   9 mol %≤structural unit (III)≤24 mol %
   9 mol %≤structural unit (IV)≤24 mol %.

2. The wholly aromatic liquid crystalline polyester resin according to claim 1, wherein
   the composition ratio (mol %) of said structural units (I) to (IV) satisfies the following conditions:
   2 mol %≤structural unit (I)≤9 mol %
   48 mol %≤structural unit (II)≤70 mol %
   10 mol %≤structural unit (III)≤23 mol %
   10 mol %≤structural unit (IV)≤23 mol %.

3. The wholly aromatic liquid crystalline polyester resin according to claim 1, wherein
   said structural unit (III) is represented by the following formula:

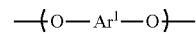

wherein $Ar^1$ is selected from the group consisting of a phenyl group, a biphenyl group, a naphtyl group, an anthryl group, and a phenanthryl group, optionally having a substituent group.

4. The wholly aromatic liquid crystalline polyester resin according to claim 1, wherein
   said structural unit (IV) is represented by the following formula:

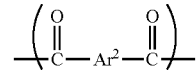

wherein $Ar^2$ is selected from the group consisting of a phenyl group, a biphenyl group, a naphtyl group, an anthryl group, and a phenanthryl group, optionally having a substituent group.

5. The wholly aromatic liquid crystalline polyester resin according to claim 1, wherein
   a draw ratio of a melt strand extruded under the conditions in which a temperature is +20° C. a melting point and a shear rate is 1000 s$^{-1}$ is 10 times or more.

6. The wholly aromatic liquid crystalline polyester resin according to claim 1, wherein
a dielectric tangent in measurement frequency of 10 GHz is $0.85 \times 10^{-3}$ or less.

7. The wholly aromatic liquid crystalline polyester resin according to claim 1, wherein
a dielectric tangent in measurement frequency of 82 GHz is less than $3.5 \times 10^{-3}$.

8. The wholly aromatic liquid crystalline polyester resin according to claim 1, wherein
dielectric tangents at 30° C. and 100° C. in measurement frequency of 34 GHz are less than $2.0 \times 10^{-3}$ and less than $4.0 \times 10^{-3}$ respectively.

9. The wholly aromatic liquid crystalline polyester resin according to claim 1, wherein
a change rate of a dielectric tangent from 30° C. to 100° C. in measurement frequency of 34 GHz is less than $3.0 \times 10^{-5}$/° C.

10. The wholly aromatic liquid crystalline polyester resin according to claim 1, having a melting point of 290° C. or more.

11. The wholly aromatic liquid crystalline polyester resin according to claim 1, wherein
a melt viscosity at a shear rate of 1000 $s^{-1}$ is from 20 to 150 Pa·s.

12. A molded article comprising the wholly aromatic liquid crystalline polyester resin according to claim 1.

13. The molded article according to claim 12 which is in the form of a film.

14. The molded article according to claim 12 which is in the form of a fiber.

15. The molded article according to claim 12 which is an injection molded article.

16. Electric and electronic components comprising the molded article according to claim 12.

* * * * *